United States Patent
Takatori et al.

(10) Patent No.: US 6,743,150 B2
(45) Date of Patent: Jun. 1, 2004

(54) LOCK-UP CONTROL DEVICE FOR TORQUE CONVERTER OF AUTOMATIC TRANSMISSION

(75) Inventors: Kazuhiro Takatori, Fuji (JP); Osamu Sato, Fuji (JP); Tatsuya Imamura, Fuji (JP); Yasushi Fujita, Fuji (JP); Kazuhito Sano, Fuji (JP); Kazuo Tomioka, Fuji (JP)

(73) Assignee: Jatco LTD (JP)

( * ) Notice: Subject to any disclaimer, the term of this patent is extended or adjusted under 35 U.S.C. 154(b) by 0 days.

(21) Appl. No.: 10/120,850

(22) Filed: Apr. 10, 2002

(65) Prior Publication Data

US 2002/0173404 A1 Nov. 21, 2002

(30) Foreign Application Priority Data

Apr. 11, 2001 (JP) ........................................ 2001-112441

(51) Int. Cl.$^7$ ............................................... B60K 41/22
(52) U.S. Cl. ........................................ 477/176; 477/905
(58) Field of Search ............................... 477/174, 175, 477/176, 905

(56) References Cited

U.S. PATENT DOCUMENTS

| | | | | |
|---|---|---|---|---|
| 5,626,536 A | * | 5/1997 | Kono et al. | 477/181 |
| 5,643,136 A | * | 7/1997 | Kono et al. | 477/174 X |
| 5,697,479 A | * | 12/1997 | Kono et al. | 477/176 X |
| 5,803,868 A | * | 9/1998 | Kono et al. | 477/174 X |
| 5,842,953 A | * | 12/1998 | Yasue et al. | 477/174 |
| 6,056,667 A | * | 5/2000 | Sasaki | 477/174 |

FOREIGN PATENT DOCUMENTS

| | | | | |
|---|---|---|---|---|
| JP | 404039131 | * | 2/1992 | 477/169 X |
| JP | 404362428 | * | 12/1992 | 477/176 |

* cited by examiner

*Primary Examiner*—Ha Ho
(74) *Attorney, Agent, or Firm*—Rossi & Associates

(57) ABSTRACT

A lock-up control device for a lock-up torque converter of an automatic transmission is provided which starts measuring an elapsed time when the throttle opening exceeds a first predetermined value due to depression of an accelerator pedal during lock-up clutch slip control. When the throttle opening exceeds a second predetermined value due to sudden depression of the accelerator pedal prior to the elapse of a determination time, a transmission controller terminates the lock-up clutch slip control. After a rapid increase, the slip amount starts decreasing upon termination of the lock-up clutch slip control. Therefore, the temperature of a facing stops rising when the lock-up clutch slip control is terminated, and this improves the durability of the facing. The lock-up clutch slip control is re-started when the throttle opening is reduced to a predetermined value, and this maintains the excellent fuel economy performance.

12 Claims, 3 Drawing Sheets

LOCK-UP CONTROL DEVICE FOR TORQUE CONVERTER OF AUTOMATIC TRANSMISSION

BACKGROUND OF THE INVENTION

1. Field of the Invention

This invention relates to a lock-up control device for a lock-up torque converter of an automatic transmission.

2. Description of the Prior Art

In an automatic transmission using a torque converter of a vehicle, the torque converter is comprised of a lock-up clutch that completely locks up the torque converter while the vehicle is running at a high speed, and keeps the lock-up clutch in a lock-up clutch slip state, in which the lock-up clutch is engaged in such a manner as to slip slightly, while the vehicle is running at a predetermined intermediate speed in order to improve the fuel economy performance and reduce the vibrations.

The lock-up slip state assumes that the vehicle is running while an accelerator pedal is not so deeply depressed. If the accelerator pedal is deeply depressed in the lock-up clutch slip state contrary to the assumption, the engine speed considerably rises to rapidly increase the slip amount of the torque converter and raise the temperature of a facing in the engaged lock-up clutch. If no measures are taken to solve this problem, the durability of the lock-up clutch is deteriorated.

SUMMARY OF THE INVENTION

It is therefore an object of the present invention to provide a lock-up control device for a torque converter of an automatic transmission, which prevents deterioration of the durability of a lock-up clutch even if an accelerator pedal is deeply depressed.

To accomplish this object, the present invention provides a lock-up control device for a torque converter having a hydraulic lock-up clutch provided with a facing, comprising a slip corresponding amount detecting means for detecting a slip corresponding amount of the torque converter; and a lock-up slip termination means that terminates lock-up clutch slip control when the slip corresponding amount exceeds a first predetermined value during the slip lock-up control of the lock-up clutch. This prevents the temperature of the facing from rising due to the increase in slip amount of the lock-up clutch, and thus improves the durability of the lock-up clutch.

The slip corresponding amount may be the speed of change in the angle of throttle valve (throttle opening), the slip amount based on a difference between the engine speed and the turbine rotational speed, or engine torque.

In one preferred form of the present invention, the lock-up control device comprises a returning means for returning to the lock-up clutch slip control when the slip corresponding amount becomes smaller than a second predetermined value after termination of the lock-up clutch slip control. This enables reversion to the lock-up clutch slip control in early timing, and maintains the excellent fuel economy performance.

In a further preferred form of the present invention, the first predetermined value of the slip corresponding amount is determined to be greater at low oil temperatures than at higher oil temperatures. This enables continuation of the lock-up clutch slip control for a long period of time, and maintains the excellent fuel economy performance.

DETAILED DESCRIPTION OF THE PREFERRED EMBODIMENTS

The present invention will now be described in detail with reference to the drawings showing an embodiment thereof.

Figure 1:
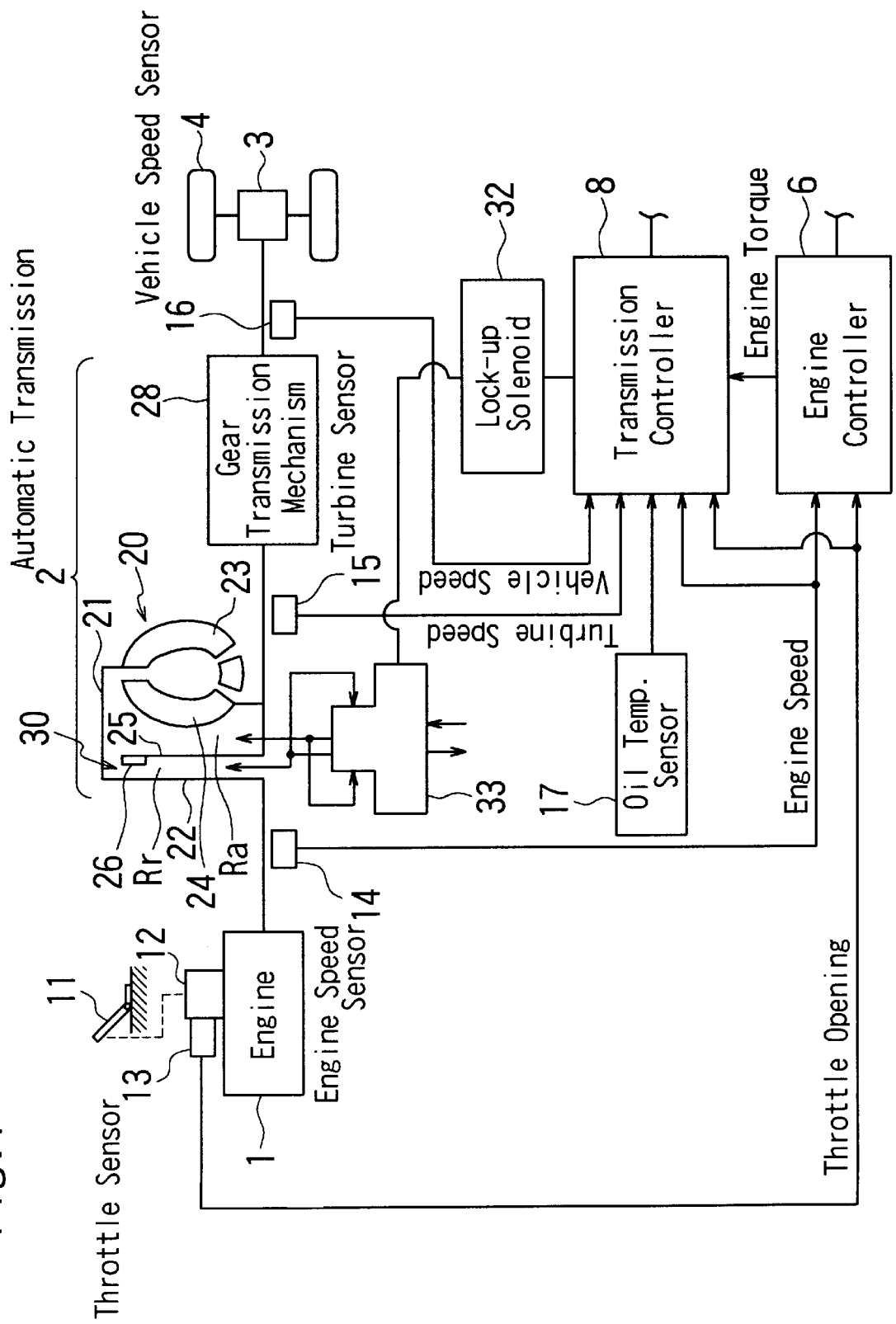
FIG. 1 is a diagram showing a drive system of a vehicle according to an embodiment of the present invention.

FIG. 1 is a diagram showing a drive system of a vehicle provided with a lock-up control device according to an embodiment of the present invention.

An automatic transmission 2 is comprised of a torque converter 20 including a lock-up clutch 30 and a gear transmission mechanism 28, and is connected to an engine 1. An output from the gear transmission mechanism 28 is transmitted to wheels 4 via a differential/final reduction gear 3.

The lock-up clutch 30 is constructed such that a clutch plate 25 connected to an input shaft of the gear transmission mechanism 28 is opposed to a disc wall 22 of a converter shell 21, which is connected to an output shaft of the engine 1 and supports an impeller 23. A facing 26 is attached to the clutch plate 25. The clutch plate 25 rotates integrally with a turbine 24.

A space between the disc wall 22 and the clutch plate 25 serves as a release chamber Rr, and a space that houses the turbine 24 disposed at the opposite side of the release chamber Rr across the clutch plate 25 serves as an apply chamber Ra. Differential pressure between apply pressure and release pressure in the respective chambers serves as engagement pressure for engaging the lock-up clutch 30.

The engagement pressure for engaging the lock-up clutch 30 is controlled by a lock-up control valve 33 that is operated according to signal pressure outputted from a lock-up solenoid 32. The lock-up solenoid 32 outputs the signal pressure corresponding to a duty command from a transmission controller 8 described later to the lock-up control valve 33 while using predetermined pilot pressure as initial pressure. This hydraulic circuit has already been made public by Japanese Laid-Open Patent Publication No. 2000-27986, for example, and therefore, a detailed description thereof is omitted herein.

A throttle opening sensor (throttle sensor) 13 and an engine speed sensor 14 are connected to the engine controller 6 that controls the engine 1, and the engine controller 6 receives a throttle opening signal representing the angle of a throttle valve 12 of the engine 1, which is opened and closed according to the operation of an accelerator pedal 11, and a revolutionary speed (engine speed) signal representing the revolutionary speed of an output shaft of the engine 1. According to these signals, the engine controller 6 finds required engine torque and controls the fuel injection quantity and ignition timing of the engine 1.

The transmission controller 8 that controls the automatic transmission 2 receives a turbine rotational speed (turbine speed) signal from a turbine sensor 15, a vehicle speed signal from a vehicle speed sensor 16, an oil temperature signal from an oil temperature sensor 17, the throttle opening signal and the engine speed signal, and also receives an engine torque signal from the engine controller 6. According to these signals, the transmission controller 8 changes revolution transmission paths in the gear transmission mechanism 28 to achieve a gear position suitable for the driving conditions of the vehicle.

It should be noted that in FIG. 1, only an output to the lock-up solenoid 32 of a lock-up control system is illustrated as an output for controlling the transmission controller 8.

If the slip amount of the facing 26 is increased due to depression of the accelerator pedal 11 during lock-up clutch slip control, the transmission controller 8 terminates the lock-up clutch slip control to disengage the engaged lock-up clutch 30 to thereby prevent the facing 26 from slipping considerably. The increase in slip amount is determined based on the speed of change in the throttle opening as a slip corresponding amount.

After the termination of the lock-up clutch slip control, the lock-up clutch slip control is re-started when the automatic transmission 2 is brought into the state in which a sharp increase in temperature of the facing 26 never occurs.

Figure 2:
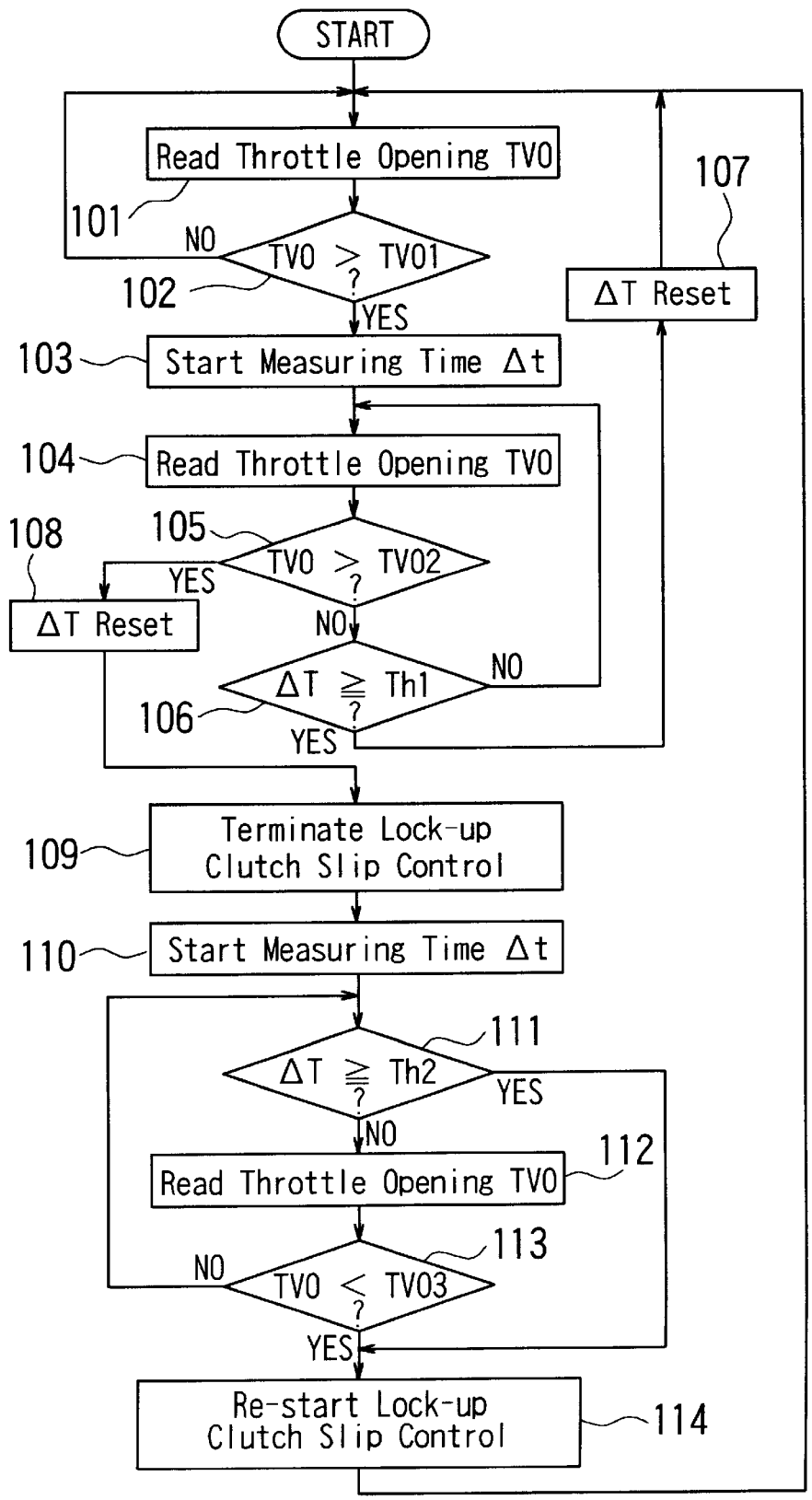
FIG. 2 is a flow chart showing the flow of operations for providing control according to the embodiment.

Referring next to a flow chart of FIG. 2, a description will now be given of the flow of operations for providing the lock-up clutch slip control by the transmission controller 8.

First, the transmission controller 8 reads a throttle opening TVO from the throttle opening sensor 13 in a step 101, and determines whether or not the throttle opening TVO is greater than a first threshold TVO1 in a step 102.

While the throttle opening TVO is equal to or smaller than the threshold TVO1, the steps 101 and 102 are repeated, but when the throttle opening TVO becomes greater than the threshold TVO1, the process proceeds to a step 103 wherein the transmission controller 8 starts measuring a subsequently elapsed time ΔT.

The transmission controller 8 reads the throttle opening TVO again in a step 104.

In a step 105, the transmission controller 8 checks whether or not the throttle opening TVO is greater than a second threshold TVO2. If the throttle opening TVO is not greater than the second threshold TVO2, the process proceeds to a step 106 wherein the transmission controller 8 checks whether the elapsed time ΔT has reached a predetermined determination time Th1. If the elapsed time ΔT has not yet reached the predetermined determination time Th1, the process returns to the step 104.

A difference between the throttle opening TVO at a point in time when the determination time Th1 is elapsed and the first threshold TVO1 at the start of the control is equivalent to the speed of change in the throttle opening.

Specifically, a threshold of the speed of change in the throttle opening is represented by (TVO2−TVO1)/Th1, and the steps 105 and 106 are intended to check whether or not the speed of change in the throttle opening is greater than the threshold thereof. The respective values of TVO1, TVO2, and Th1 are found according to the limit at which the temperature of the facing 26 rapidly increases and which is found by conducting an experiment.

Figure 3A:
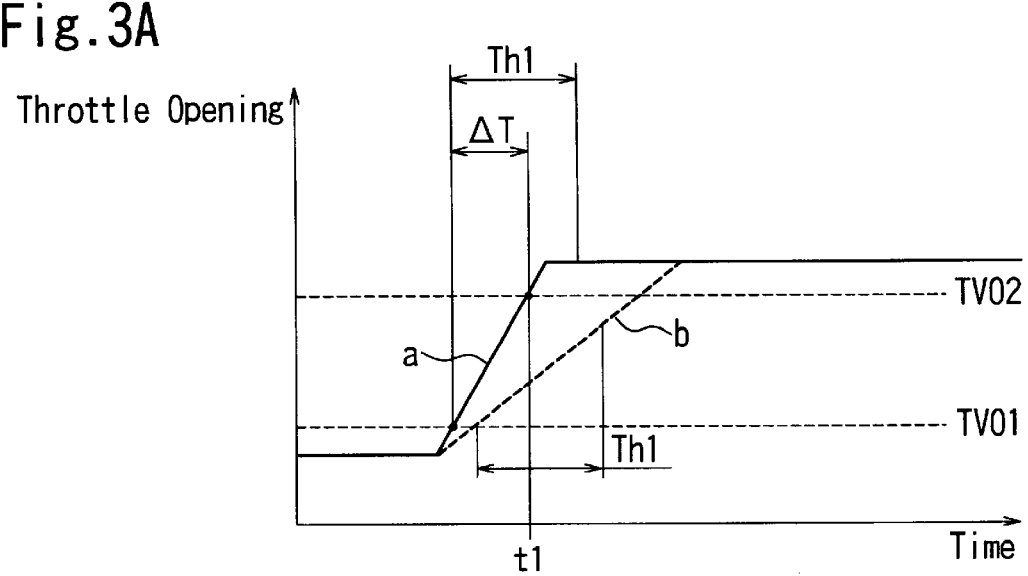
FIG. 3A–FIG. 3D are graphs showing changes in parameters during the control.

If the determination time Th1 is reached while the throttle opening TVO is equal to or smaller than the second threshold TVO2 as indicated by a throttle opening change line represented by a broken line "b" in FIG. 3A, the process proceeds from the step 106 to a step 107 wherein the elapsed time ΔT is reset, and the process returns to the step 101 to start the next flow of operations.

On the other hand, if it is checked in the step 105 that the throttle opening TVO becomes greater than the second threshold TVO2 due to the sudden and great depression of the accelerator pedal 11 prior to the elapse of the determination time Th1 as indicated by a throttle angel change line represented by a solid line "a" in FIG. 3A, the elapsed time ΔT is reset in a step 108 and the process then proceeds to a step 109 wherein the transmission controller 8 terminates the lock-up clutch slip control.

Figure 3B:
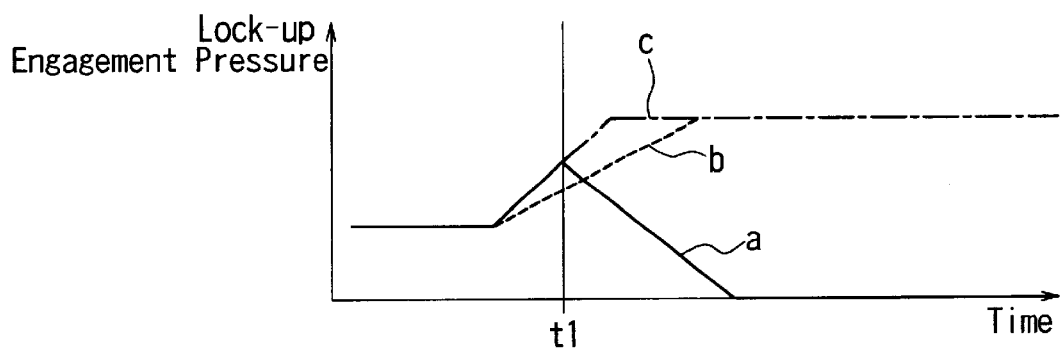

Specifically, as indicated by a solid line "a" in FIG. 3B, at a time T1 when the throttle opening TVO becomes greater than the second threshold TVO2, oil pressure is released from the apply chamber Ra and oil pressure is supplied to the release chamber Rr to release the engagement pressure for engaging the lock-up clutch 30. It should be noted that a virtual line "c" in FIG. 3B indicates a change in engagement pressure corresponding to the throttle opening in the case where the transmission controller 8 does not terminate the lock-up clutch slip control, and a broken line "b" in FIG. 3B indicates a change in engagement pressure in the case where the throttle opening changes slowly.

Figure 3C:
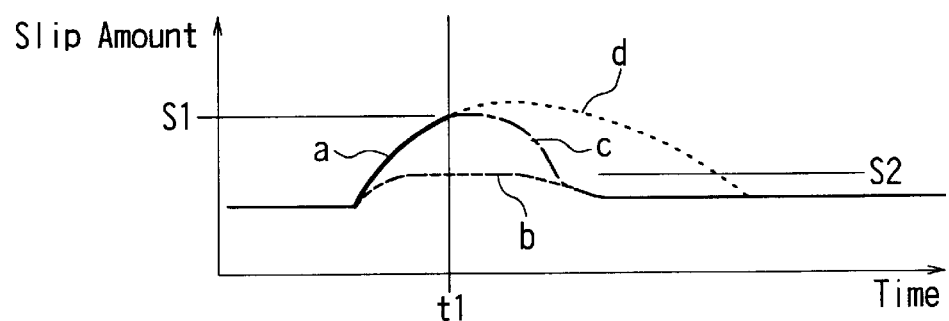

In the control process described above, the slip amount increases more rapidly as indicated by a solid line "a" in FIG. 3C in the case where the throttle opening changes rapidly than in the case where the throttle opening changes slowly as indicated by a broken line "b". A virtual line "c" indicates a change in slip amount from the time t1 in the case where the transmission controller 8 does not terminate the lock-up clutch slip control.

A dotted line "d" in FIG. 3C indicates the slip amount after the lock-up clutch slip control is terminated at the time t1. Even if the slip amount exceeds the slip amount indicated by the line "c", the friction of the facing 26 does not occur since the lock-up clutch 30 has already been disengaged.

Figure 3D:
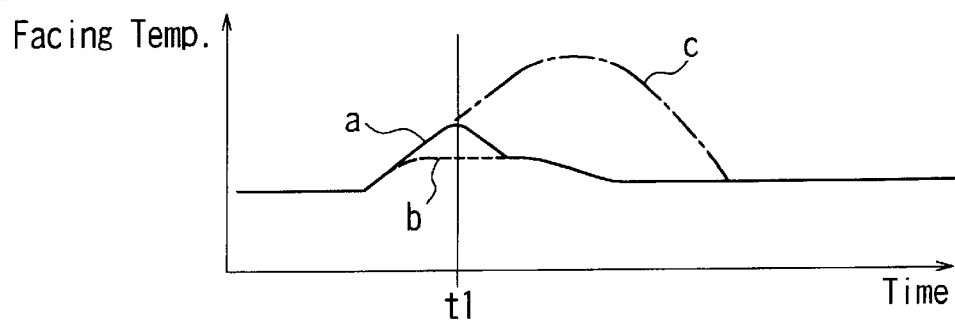

FIG. 3D shows the temperature of the facing 26. Due to the termination of the lock-up clutch slip control, the temperature of the facing 26 stops rising at the time t1 as indicated by a solid line "a", and the rise in temperature of the facing 26 is much smaller than in the case where the transmission controller 8 does not terminate the lock-up clutch slip control as indicated by a virtual line "c". It should be noted that a broken line "b" indicates the temperature of the facing 26 in the case where the throttle opening changes slowly.

If the transmission controller 8 terminates the lock-up clutch slip control in the step 109, the process proceeds to a step 110 wherein the transmission controller 8 starts measuring a subsequently elapsed time ΔT. The process then proceeds to a step 111 wherein the transmission controller 8 cheeks whether or not the elapsed time ΔT has reached a predetermined determination time Th2.

A period of time in which the temperature of the facing 26 lowers to reach a level of the temperature in the case where the throttle opening changes slowly is found in advance by conducting an experiment, and is set as the determination time Th2.

If the elapsed time ΔT has not yet reached the determination time Th2, the transmission controller 8 reads the throttle opening TVO in a step 112.

In a step 113, the transmission controller 8 checks whether or not the throttle opening TVO is smaller than a third threshold TVO3. If the throttle opening is not smaller than the third threshold TVO3, the process returns to the step 111.

An opening (angle), at which a rapid increase in the slip amount hardly occurs even if the accelerator pedal 11 is deeply depressed, is found in advance by conducting an experiment, and is set as the third threshold TVO3.

If the elapsed time ΔT has reached the determination time Th2 during the repetition of the steps 111 to 113, the process proceeds from the step 111 to a step 114 to re-start the lock-up clutch slip control.

Even if the elapsed time ΔT has not yet reached the determination time Th2, the process proceeds from the step 113 to the step 114 if the throttle opening TVO becomes smaller than the third threshold TVO3.

Upon completion of the step 114, the process returns to the step 110.

According to the above-described embodiment, if the speed of change in the throttle opening TVO is higher than a predetermined value during the lock-up clutch slip control, the transmission controller 8 terminates the lock-up clutch slip control. This prevents the temperature of the facing 26 from rising due to the increase in slip amount of the lock-up clutch 30 to thus improve the durability of the lock-up clutch 30.

Further, after the termination of the lock-up clutch slip control, the lock-up clutch slip control is permitted again upon elapse of the time Th2 in which the temperature of the facing 26 is lowered, or when the throttle opening reaches the predetermined threshold TVO3 at which the rapid increase in slip amount hardly occurs, and the time Th2 and the threshold TVO3 are determined based upon the results of the experiments. This enables reversion to the lock-up clutch slip control in early timing, and improves the fuel economy performance and reduces the vibrations satisfactorily.

Although in the above-described embodiment, the rapid increase in slip amount of the lock-up clutch 30 is detected by checking whether or not the speed of change in the throttle opening as the slip corresponding amount is greater than a predetermined value, and the lock-up clutch slip control is terminated if the speed of change in the throttle opening is greater than the predetermined value, whether the lock-up clutch slip control should be terminated or not may be determined by checking the slip amount itself as the slip corresponding amount instead of the speed of change in the throttle opening.

Specifically, a high-level threshold S1 of the slip amount may be set as shown in FIG. 3C so that the lock-up clutch slip control is terminated when the slip amount exceeds the threshold S1 and the lock-up clutch slip control is started again when the slip amount becomes smaller than a low-level threshold S2.

The slip amount is calculated as a difference between the engine speed and the turbine rotational speed.

In another variation, an engine torque signal inputted from the engine controller 6 to the transmission controller 8 may be used as the slip corresponding amount since the engine torque and the slip amount are correlated to each other. In this case, the lock-up clutch slip control is terminated when the engine torque exceeds a predetermined high-level threshold, and the lock-up clutch slip control is started again when the engine torque becomes smaller than a low-level threshold.

In yet another variation, with reference to the oil temperature detected by the oil temperature sensor 17, the speed of change in the throttle opening and the thresholds of the slip amount and engine torque serving as the slip corresponding amount may be determined to be greater at lower oil temperatures. Setting a high threshold or the like at a low temperature continues the lock-up clutch slip control for a long period of time due to the low temperature of the facing 26, and this maintains the excellent fuel economy performance.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A lock-up control device for a torque converter of an automatic transmission having a hydraulic lock-up clutch provided with a facing, comprising:

slip corresponding amount detecting means for detecting a slip corresponding amount of the torque converter;

lock-up slip termination means for terminating lock-up clutch slip control when the slip corresponding amount exceeds a first predetermined value during the slip lock-up control of the lock-up clutch; and returning means for returning to the lockup clutch slip control upon elapse of a predetermined time after termination of the lock-up clutch control.

2. A lock-up control device for a torque converter of an automatic transmission according to claim 1, wherein said slip corresponding amount detecting means detects a speed of change in throttle opening of an engine as the slip corresponding amount.

3. A lock-up control device for a torque converter of an automatic transmission according to claim 1, wherein said slip corresponding amount detecting means detects a slip amount based upon a difference between an engine speed and a turbine rotational speed as the slip corresponding amount.

4. A lock-up control device for a torque converter of an automatic transmission according to claim 1, wherein said slip corresponding amount detecting means detects an engine torque as the slip corresponding amount.

5. A lock-up control device for a torque converter of an automatic transmission according to claim 2, further including returning means for returning to the lock-up clutch slip control when a throttle opening becomes smaller than a second predetermined value after termination of the lock-up clutch slip control.

6. A lock-up control device for a torque converter of an automatic transmission according to claim 3 or further including returning means for returning to the lock-up clutch slip control when the slip corresponding amount becomes smaller than a second predetermined value after termination of the lock-up clutch slip control.

7. A lock-up control device for a torque converter of an automatic transmission having a hydraulic lock-up clutch provided with a facing, comprising:

slip corresponding amount detecting means for detecting a slip corresponding amount of the torque converter; and lock-up slip termination means for terminating lock-up clutch slip control when the slip corresponding amount exceeds a first predetermined value during the slip lock-up control of the lock-up clutch; and wherein the first predetermined value of the slip corresponding amount is determined to be greater at lower oil temperatures than at higher oil temperatures.

8. A lock-up control device for a torque converter of an automatic transmission according to claim 7, wherein said slip corresponding amount detecting means detects a speed of change in throttle opening of an engine as the slip corresponding amount.

9. A lock-up control device for a torque converter of an automatic transmission according to claim 7, wherein said slip corresponding amount detecting means detects a slip amount based upon a difference between an engine speed and a turbine rotational speed as the slip corresponding amount.

10. A lock-up control device for a torque converter of an automatic transmission according to claim 7, wherein said slip corresponding amount detecting means detects an engine torque as the slip corresponding amount.

11. A lock-up control device for a torque converter of an automatic transmission according to claim 8, further including returning means for returning to the lock-up clutch slip control when a throttle opening becomes smaller than a second predetermined value after termination of the lock-up clutch slip control.

12. A lock-up control device for a torque converter of an automatic transmission according to claim 9 or 10, further including returning means for returning to the lock-up clutch slip control when the slip corresponding amount becomes smaller than a second predetermined value after termination of the lock-up clutch slip control.

\* \* \* \* \*